United States Patent
McDaniel et al.

(10) Patent No.: US 10,072,199 B2
(45) Date of Patent: Sep. 11, 2018

(54) METALATE-BASED ADDITIVES FOR USE IN SUBTERRANEAN FORMATIONS

(71) Applicant: Halliburton Energy Services, Inc., Houston, TX (US)

(72) Inventors: Cato Russell McDaniel, Montgomery, TX (US); Hui Zhou, The Woodlands, TX (US); Timothy N. Harvey, Humble, TX (US); William Walter Shumway, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/328,259

(22) PCT Filed: Mar. 17, 2015

(86) PCT No.: PCT/US2015/020953
§ 371 (c)(1),
(2) Date: Jan. 23, 2017

(87) PCT Pub. No.: WO2016/148698
PCT Pub. Date: Sep. 22, 2016

(65) Prior Publication Data
US 2017/0204319 A1    Jul. 20, 2017

(51) Int. Cl.
*C09K 8/32*    (2006.01)
*C09K 8/64*    (2006.01)
(Continued)

(52) U.S. Cl.
CPC ............. *C09K 8/32* (2013.01); *C09K 8/528* (2013.01); *C09K 8/565* (2013.01); *C09K 8/64* (2013.01);
(Continued)

(58) Field of Classification Search
CPC .. C09K 2208/32; C09K 2208/34; C09K 8/32; C09K 8/528; C09K 8/565; C09K 8/64; C09K 8/72
See application file for complete search history.

(56) References Cited

U.S. PATENT DOCUMENTS 2,708,180 A * 5/1955 Nonnenmacher ........ B01J 21/00
                                                       208/111.25
4,816,303 A    3/1989 Kroenke et al.
(Continued)

FOREIGN PATENT DOCUMENTS

| CN | 103409129 A | 11/2013 |
| GB | 27002       | 6/1906  |
| JP | 56-044797 A | 4/1981  |

OTHER PUBLICATIONS

Ekeley, John B. "Some Organic Tungstates." Journal of the American Chemical Society 31.6 (1909): 664-666.
(Continued)

*Primary Examiner* — Alicia Bland
(74) *Attorney, Agent, or Firm* — Tenley Krueger; Baker Botts L.L.P.

(57) ABSTRACT

Methods and compositions for the use of treatment fluids comprising metalate-based additives to treat subterranean formations are provided. In one embodiment, the methods comprise providing a treatment fluid comprising a non-aqueous base fluid and at least one metalate-based additive comprising: an anion selected from the group consisting of: a tungstate, a molybdate, a vanadate, a manganate, and any combination thereof, and an organic cation; and introducing the treatment fluid into a wellbore penetrating at least a portion of a subterranean formation.

19 Claims, 1 Drawing Sheet

(51) Int. Cl.
*C09K 8/72* (2006.01)
*C09K 8/528* (2006.01)
*C09K 8/565* (2006.01)

(52) U.S. Cl.
CPC ............ *C09K 8/72* (2013.01); *C09K 2208/32* (2013.01); *C09K 2208/34* (2013.01)

(56) References Cited

U.S. PATENT DOCUMENTS

| | | | |
|---|---|---|---|
| 5,532,212 | A | 7/1996 | Patel |
| 7,273,832 | B2 | 9/2007 | Benton et al. |
| 8,614,170 | B2 | 12/2013 | Ali et al. |
| 8,697,611 | B2 | 4/2014 | Zhang et al. |
| 2005/0221495 | A1 | 10/2005 | Bell et al. |
| 2006/0116296 | A1* | 6/2006 | Kippie ............... C09K 8/12 507/244 |
| 2008/0135302 | A1* | 6/2008 | Zhang ............... C09K 8/36 175/70 |
| 2008/0139419 | A1 | 6/2008 | Huang |
| 2011/0195015 | A1* | 8/2011 | Reynolds ............ B01J 27/04 423/511 |
| 2011/0226665 | A1* | 9/2011 | Milam ............... B01J 27/04 208/97 |
| 2012/0295820 | A1* | 11/2012 | Falana ............... C09K 8/06 507/128 |
| 2013/0098615 | A1 | 4/2013 | Perez et al. |
| 2014/0179575 | A1 | 6/2014 | Boudreau |
| 2015/0192229 | A1* | 7/2015 | Goto ............... E21B 17/042 285/94 |
| 2016/0122614 | A1 | 5/2016 | McDaniel et al. |
| 2016/0145484 | A1 | 5/2016 | Shumway et al. |

OTHER PUBLICATIONS

International Search Report and Written Opinion issued in related PCT Application No. PCT/US2015/020953 dated Oct. 16, 2015, 15 pages.
Alonso, G., G. Berhault, and R. R. Chianelli. "Synthesis and characterization of tetraalkylammonium thiomolybdates and thiotungstates in aqueous solution." Inorganica Chimica Acta 316.1 (2001): 105-109.
McDonald, John W., et al. "Syntheses and characterization of ammonium and tetraalkylammonium thiomolybdates and thiotungstates." Inorganica Chimica Acta 72 (1983): 205-210.
International Preliminary Report on Patentability issued in related Application No. PCT/US2015/020953, dated Sep. 28, 2017 (11 pages).
Material Safety Data Sheet, Choline Chloride 70% Solution, Eastman Chemical Company, Jan. 2017, 10 pages.
Definitions for "amount concentration" and "concentration" from IUPAC Green Book, 2nd ed. page 42, found at https://goldbook.iupac.org/html/a/A00295.html and https://goldbook.iupac.org/html/C/C01222.html respectively, 2 pages.

* cited by examiner

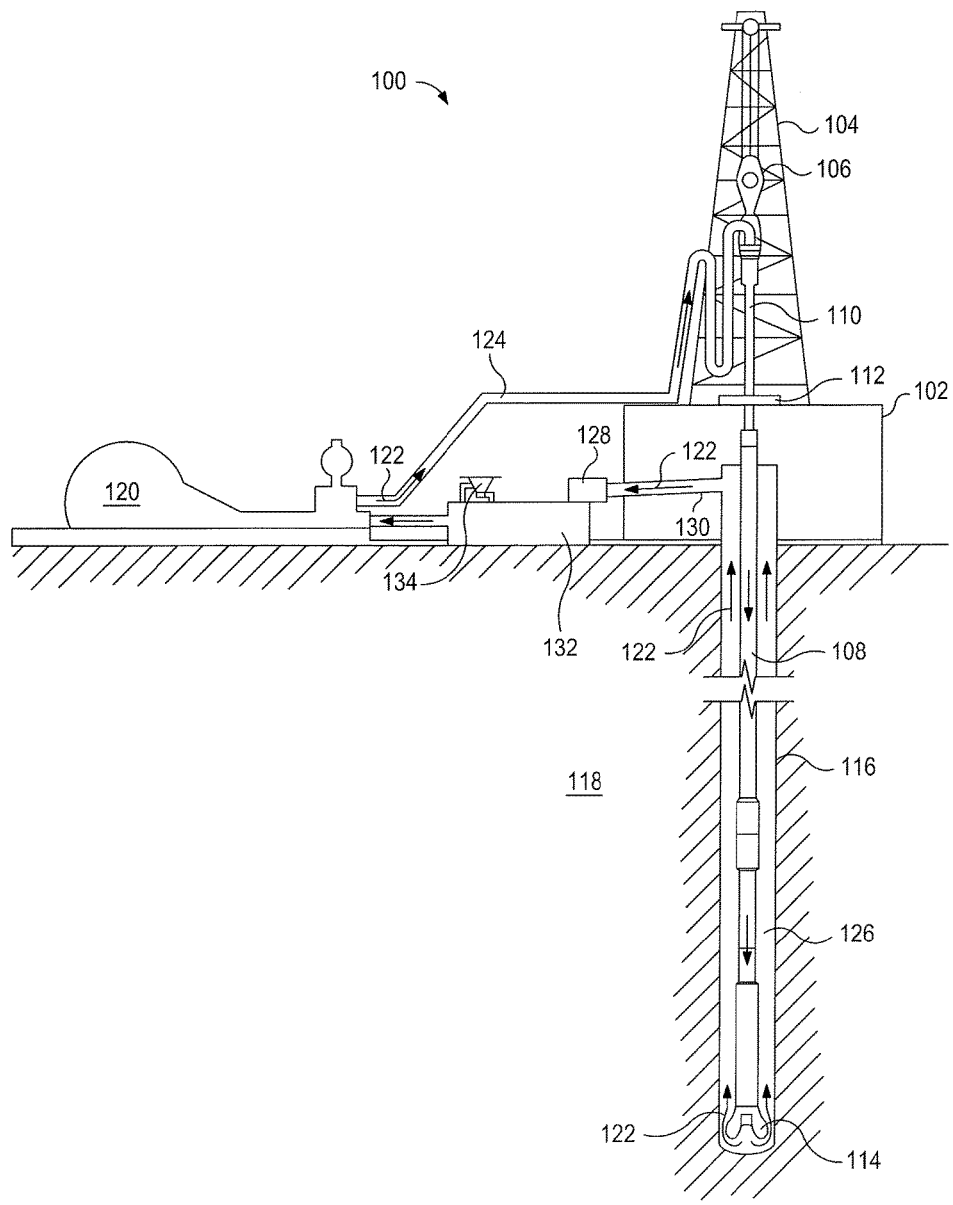

METALATE-BASED ADDITIVES FOR USE IN SUBTERRANEAN FORMATIONS

CROSS-REFERENCE TO RELATED APPLICATION

The present application is a U.S. National Stage Application of International Application No. PCT/US2015/020953 filed Mar. 17, 2015, which is incorporated herein by reference in its entirety for all purposes.

BACKGROUND

The present disclosure relates to methods and compositions for treating subterranean formations.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, drilling operations, fracturing operations, gravel packing operations, acidizing operations, completion operations, scale dissolution and removal, consolidation operations, and the like.

Treatment fluids often contain additives such as viscosifying agents, weighting agents, lubricants, pH corrosion inhibitors, surfactants, and scavengers. Each separate additive increases the cost and complexity of the operation. Typical viscosifying agents include xanthan or carbohydrate gums, cellulosic derivatives, and other polysaccharides. However, these may degrade in high temperature applications, potentially causing the treatment fluid to prematurely lose viscosity.

Treatment fluids are usually weighted with high density insoluble solids. However, these have a propensity to settle over time, potentially causing problems with production and inducing formation damage. Naphthalenic oils are sometimes used to increase density, but have a minor effect on density and raise health, safety, and environmental concerns. Cesium formate-based brines are often used as weighting agents, but cesium is not always sufficient to achieve the desired density, and it can be costly and unreliable due to cesium's rarity. Furthermore, cesium-based brines may cause stress corrosion cracking in the wellbore.

BRIEF DESCRIPTION OF THE DRAWINGS

These drawings illustrate certain aspects of some of the embodiments of the present disclosure, and should not be used to limit or define the claims.

FIG. 1 is a diagram illustrating an example of a wellbore drilling assembly that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation specific decisions may be made to achieve the specific implementation goals, which may vary from one implementation to another. Moreover, it will be appreciated that such a development effort might be complex and time consuming, but would nevertheless be a routine undertaking for those of ordinary skill in the art having the benefit of the present disclosure.

The present disclosure relates to methods and compositions for treating subterranean formations. Particularly, the present disclosure relates to methods and compositions for the use of treatment fluids comprising metalate-based additives to treat subterranean formations.

More specifically, the present disclosure provides methods and compositions for providing a treatment fluid comprising a base fluid and at least one metalate-based additive and introducing the treatment fluid into a wellbore penetrating at least a portion of a subterranean formation. According to certain embodiments, the treatment fluids may comprise a non-aqueous base fluid and a metalate-based additive comprising: an anion selected from the group consisting of: a tungstate, a molybdate, a vanadate, a manganate, and any combination thereof, and an organic cation. In some embodiments, the present disclosure provides treatment fluids comprising a base fluid and at least one metalate-based additive comprising an anion selected from the group consisting of: a manganate, a vanadate, and any combination thereof. In certain embodiments, the treatment fluids may comprise a base fluid and at least one metalate-based additive comprising an anion selected from the group consisting of: a thiotungstate, a thiomolybdate, a thiovanadate, a thiomanganate, and any combination thereof. In certain embodiments, the treatment fluids may comprise a base fluid and at least one metalate-based viscosifying agent comprising an anion selected from the group consisting of: a tungstate, a molybdate, a vanadate, a manganate, a thiotungstate, a thiomolybdate, a thiovanadate, a thiomanganate, and any combination thereof, wherein the metalate-based viscosifying agent is present at a concentration of from about 0.1% to about 30% by weight of the treatment fluid. According to certain embodiments, the present disclosure provides compositions comprising a hydroxylic base fluid and a metalate-based additive comprising an anion selected from the group consisting of: a thiotungstate, a thiomolybdate, a thiovanadate, a thiomanganate, and any combination thereof.

Among the many potential advantages of the methods and compositions of the present disclosure, only some of which are alluded to herein, the methods and compositions of the present disclosure may provide more efficient and cost-effective weighting and viscosifying agents for treatment fluids. Metalates that are soluble in a treatment fluid may provide a solids-free weighting agent by permitting the fluid to derive most of its density from the solubilized metalate-based additive. For example, in some embodiments, thiomolybdates, thiotungstates, thiovanadates, and thiomanganates are water-soluble and can act as a solids-free weighting agent in aqueous fluids. Fewer high gravity solids in treatment fluids may allow for faster and more efficient wellbore operations. Additionally, molybdates, tungstates, vanadates, and manganates may be more cost effective and robust as they may be more commercially available than typical weighting salts such as cesium formate.

Another advantage of the methods and compositions of the present disclosure is that the compositions disclosed herein may be more thermally stable than typical viscosifying agents. For example, viscosifying agents such as xanthan and carbohydrate gums often degrade around 175° F. to 275° F., but the metalate-based additives of the present disclosure may remain stable at temperatures above 350° F. In certain embodiments, a metalate-based viscosifying agent may increase the viscosity of a treatment fluid. For example, a metalate-based viscosifying agent may be a thermally stable viscosifying agent for a hydroxylic fluid. The additives of the present disclosure also may synergize other viscosifying agents in the hydroxylic fluid.

Another advantage of the methods and compositions of the present disclosure is the versatility of the metalate-based additives. For example, in addition to increasing viscosity and density, metalate-based additives also may inhibit corrosion, lubricate, and scavenge hydrogen sulfide, water, and/or oxygen. This may eliminate the need for additional additives, reducing the cost and complexity of wellbore operations.

According to certain embodiments, the metalate-based additives of the present disclosure may comprise a metalate alone, or alternatively, a salt of a metalate and a cation. Metalates are complex anions of a metal ligated to several atoms or groups. In some embodiments, the metalate-based additive may comprise a polymetalate, i.e., a metalate comprising more than one metal atom. Polymetalates may be iso-polymetalates, i.e., comprising the same central metal atoms, or hetero-polymetalates, i.e., comprising different central metal atoms.

In certain embodiments, the metalate comprises a transition metal. Examples of suitable transition metals include, but are not limited to molybdenum, tungsten, vanadium, manganese, group 3-12 transition metals, and any combination thereof. Metalates are often referred to by reference to the central metal (e.g., molybdates, tungstates, vanadates, manganates).

In some embodiments, the metalate may comprise oxygen ligand atoms. Examples of suitable metalates comprising oxygen ligands include, but are not limited to $HWO_4^-$, $W_2O_7^{2-}$, $W_7O_{24}^{6-}$, $W_{10}O_{32}^{4-}$, $H_2W_{12}O_{40}^{6-}$, $H_2W_{12}O_{42}^{10-}$, $MoO_4^{2-}$, $Mo_2O_7^{2-}$, $Mo_3O_{10}^{2-}$, $Mo_4O_{13}^{2-}$, $Mo_5O_{16}^{2-}$, $Mo_6O_{19}^{2-}$, $Mo_7O_{24}^{6-}$, $Mo_8O_{26}^{4-}$, $VO_4^{3-}$, $V_2O_7^{4-}$, $V_3O_9^{3-}$, $V_4O_{12}^{4-}$, $V_5O_{14}^{3-}$, $V_{10}O_{28}^{6-}$, $V_{12}O_{32}^{4-}$, $V_{13}O_{34}^{3-}$, $V_{18}O_{42}^{12-}$, $MnO_4^{2-}$, $MnO_4^-$, $Mn_2O_6^{6-}$, and any combination thereof.

In certain embodiments, the metalate comprises sulfur ligand atoms. Metalates comprising sulfur ligand atoms are often referred to a thiometalates (e.g., thiomolybdate, thiovanadate, thiotungstate). Examples of suitable thiometalates include, but are not limited to $VS_4^{3-}$, $VSO_3^{3-}$, $VS_2O_2^{3-}$, $VS_3O^{3-}$, $WS_4^{2-}$, $WSO_3^{2-}$, $WS_2O_2^{2-}$, $WS_3O^{2-}$, $MoS_4^{2-}$, $MoS_4^{2-}$, $MoSO_3^{2-}$, $MoS_2O_2^{2-}$, $MoS_3O^{2-}$, $MnS_4^{2-}$, $MnSO_3^{2-}$, $MnS_2O_2^{2-}$, $MnS_3O^{2-}$, and any combination thereof.

In certain embodiments, the metalate-based additives may comprise a cation. In some embodiments, the metalate-based additives may comprise an organic cation (referred to herein as "organic metalates"). In certain embodiments, the metalate-based additives may comprise an inorganic cation (referred to herein as "inorganic metalates").

As used herein, the term "organic cation" refers to a positively charged carbon-, nitrogen-, or phosphorous-based ion. In some embodiments, the organic cation may be any cationic organic base. In some embodiments, the organic cation may be a weak base. Examples of organic cations that may be suitable for use in embodiments of the present disclosure include, but are not limited to quaternary amines, polymers of quaternary amines, ammonium compounds, polymers of ammonium compounds, phosphonium compounds, polymers of phosphonium compounds, pyridine, imidazole, morpholine, and derivatives and combinations thereof.

Examples of organic metalates that may be suitable for use in embodiments of the present disclosure include, but are not limited to ammonium para tungstate, methylammonium tungstate, dimethylammonium tungstate, trimethylammonium tungstate, ethylammonium tungstate, trimehtylammonium tungstate, ethylammonium tungstate, diethylammonium tungstate, propylammonium tungstate, dipropylammonium tungstate, diamylammonium tungstate, ethylenediammonium tungstate, the corresponding molybdates, vanadates, and manganates of the same organic cations, and any combination thereof.

As used herein, the term "inorganic cation" refers to a positively charged non-organic ion. Examples of inorganic cations that may be suitable for use in embodiments of the present disclosure include, but are not limited to $H^+$, $Li^+$, $Na^+$, $K^+$, $Rb^+$, $Cs^+$, $Mg^{2+}$, $Ca^{2+}$, $Sr^{2+}$, $Ba^{2+}$, $Al^{3+}$, $Ti^{3+}$, $Ti^{4+}$, $Mn^{2+}$, $Mn^{3+}$, $Fe^{2+}$, $Fe^{3+}$, $Cu^{2+}$, $Cu^+$, $Zn^{2+}$, $Zr^{2+}$, $Zr^{3+}$, $Zr^{4+}$, and any combination thereof. Examples of inorganic metalates that may be suitable for use in embodiments of the present disclosure include, but are not limited to lithium molybdate, sodium molybdate, potassium molybdate, rubidium molybdate, cesium molybdate, lithium tungstate, sodium tungstate, potassium tungstate, rubidium tungstate, cesium tungstate, lithium vanadate, sodium vanadate, potassium vanadate, rubidium vanadate, cesium vanadate, lithium manganate, sodium manganate, potassium manganate, rubidium manganate, cesium manganate, and any combination thereof.

In certain embodiments, the metalate-based additive may viscosify a treatment fluid. In some embodiments, for example, the metalate-based additive may viscosify a hydroxylic fluid, i.e., a fluid comprising a hydroxylic compound. In certain embodiments, hydroxylic compounds comprise hydroxyl groups. Examples of hydroxylic compounds that may be suitable for use in embodiments of the present disclosure include, but are not limited to glycols, polyols, glycerin, ethanol, methanol, and the like, and any combinations thereof. In certain embodiments, ammonium para tungstate may viscosify hydroxylic fluids comprising glycerol or other hydroxylic compounds. In certain embodiments, a viscosifying metalate-based additive may be present in amount from about 0.1% to 30% by weight, about 0.1% to about 10% by weight, about 2% to 30% by weight, about 2% to 20% by weight, about 2% to 10% by weight, or less than about 30% by weight of the treatment fluid.

According to certain embodiments of the present disclosure, metalate-based additives may be used to increase the density of a treatment fluid. In some embodiments, the metalate-based additive dissolves completely in the fluid, allowing the additive to be used as a solids-free weighting agent. In certain embodiments, organic metalate-based additives may be suitable weighting agents. For example, in some embodiments, organic metalate-based additives may be suitable solids-free weighting agents for oil-based treatment fluids. In some embodiments, organic metalates may be suitable weighting agents for polar organic fluids, such as hydroxylic fluids. In some embodiments, metalate-based additives comprising an inorganic cation may be suitable weighting agents for aqueous treatment fluids or invert emulsion treatment fluids comprising an aqueous phase. In some embodiments, thiometalates may be suitable weighting agents for aqueous, oil-based, and/or invert emulsion treatment fluids. In certain embodiments, vanadates may be suitable weighting agents for aqueous, oil-based, and/or invert emulsion treatment fluids.

In certain embodiments, the treatment fluid may comprise a metalate-based additive and additional solid weighting agents. Examples of suitable solid weighting agents include, but are not limited to barite, hematite, calcium carbonate, magnesium carbonate, iron carbonate, zinc carbonate, manganese tetraoxide, ilmenite, NaCl, KCl, $CsCl_2$, formate salts, and any combination thereof. These weighting agents may be at least partially soluble or insoluble in the treatment fluid.

In certain embodiments, the metalate-based additive, or the combination of metalate-based additives with other weighting agents, may be present in an amount such that the density of the treatment fluid may be from about 7 to about 25 lbs/gal, from about 10 to about 21 lbs/gal, or from about 13 to about 20 lbs/gal. In certain embodiments, certain weighting metalate-based additives, or the combination of metalate-based additives with other weighting agents, may be present in an amount from about 10% to about 40% by weight. In certain embodiments, certain weighting metalate-based additives, or the combination of metalate-based additives with other weighting agents, may be present in an amount from about 40% to about 95% by weight, about 55% to 85% by weight, or about 70% to 85% by weight, all by weight of the treatment fluid.

In certain embodiments, the metalate-based additive may act as a lubricant. For example, the metalate-based additive may lower torque and/or drag in the wellbore and/or lubricate bit bearings. In certain embodiments, the metalate-based additive may also inhibit corrosion. For example, the metalate-based additive may provide corrosion protection for metals used in oil and gas systems, such as carbon steel. In some embodiments, the metalate-based additive may limit corrosion by scavenging oxygen. In certain embodiments, the metalate-based additive may scavenge hydrogen sulfide and/or moisture.

In certain embodiments, the treatment fluid may comprise an invert emulsion fluid, which comprises an oil or oleaginous fluid as the external or continuous phase and an aqueous or hydrophilic fluid as the internal phase. In certain embodiments, an oil-based invert emulsion-based treatment fluid may commonly comprise between about 50:50 to about 95:5 by volume oil phase to water phase. In certain embodiments, such invert emulsion fluids used in drilling may comprise: a base oil comprising the external phase of an invert emulsion; a saline, aqueous solution (typically a solution comprising about 30% calcium chloride) comprising the internal phase of the invert emulsion; emulsifiers at the interface of the internal and external phases; and other agents or additives for suspension, weight or density, oil-wetting, fluid loss or filtration control, and rheology control. In certain embodiments, the invert emulsion fluid employs a natural oil (e.g., diesel oil or mineral oil) or a synthetic base as the oil or oleaginous phase, and water comprising a salt as the aqueous or non-oleaginous phase.

The treatment fluids used in the methods and compositions of the present disclosure may comprise any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and compositions of the present disclosure may comprise water from any source. Such aqueous fluids may comprise fresh water, salt water (e.g., water containing one or more salts dissolved therein), brine (e.g., saturated salt water), seawater, or any combination thereof. In most embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Examples of non-aqueous fluids or oleaginous fluids that may be suitable for use in the methods and compositions of the present disclosure include, but are not limited to oils, hydrocarbons, organic liquids, and the like. In certain embodiments, the fracturing fluids may comprise a mixture of one or more fluids and/or gases, including but not limited to emulsions, foams, and the like.

In certain embodiments, the treatment fluids used in the methods and compositions of the present disclosure optionally may comprise any number of additional additives. Examples of such additional additives include, but are not limited to salts, surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, $H_2S$ scavengers, $CO_2$ scavengers, oxygen scavengers, lubricants, additional viscosifiers, breakers, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after a viscosifying agent has been at least partially hydrated in the fluid. A person skilled in the art, with the benefit of this disclosure, will recognize the types of additives that may be included in the fluids of the present disclosure for a particular application.

In certain embodiments, surfactants may be used together with the metalate-based additives. The surfactants may help disperse the additives in the fluid and/or stabilize emulsions. Examples of surfactants that may be suitable for use in embodiments of the present disclosure include, but are not limited to fatty acids, soaps of fatty acids, amidoamines, polyamides, polyamines, oleate esters, imidazoline derivatives, alkoxylated alkyl alcohols and salts thereof and alkoxylated alkyl phenols and salts thereof, alkyl and aryl sulfonates, sulfates, phosphates, carboxylates, polyoxyalkyl glycols, fatty alcohols, polyoxyethylene glycol sorbitan alkyl esters, sorbitan alkyl esters, polysorbates, glucosides, quaternary amine compounds, amine oxide surfactants, and any combination thereof.

The present disclosure in some embodiments provides methods for using the treatment fluids to carry out a variety of subterranean treatments, including but not limited to hydraulic fracturing treatments, acidizing treatments, and drilling operations. In certain embodiments, the treatment fluids of the present disclosure may be used for drilling, stimulation, fracturing, spotting, clean-up, completion, remedial treatment, acidizing, cementing, packing, spotting, completion, applying a pill, or any combination thereof.

A pill may comprise a relatively small quantity (e.g., less than about 500 bbl, or less than about 200 bbl) of a treatment fluid used to accomplish a specific task that the regular treatment fluid cannot perform. For example, a pill may be a high-viscosity pill to, for example, help lift solids (e.g., cuttings) out of a vertical wellbore. In certain embodiments, the present disclosure provides pills that comprise one or more metalate-based additives.

In some embodiments, the treatment fluids of the present disclosure may be used in treating a portion of a subterranean formation, for example, in acidizing treatments such as matrix acidizing or fracture acidizing. In certain embodiments, a treatment fluid may be introduced into a subterranean formation. In some embodiments, the treatment fluid may be introduced into a wellbore that penetrates a subterranean formation. In some embodiments, the treatment fluid may be introduced at a pressure sufficient to create or enhance one or more fractures within the subterranean formation (e.g., hydraulic fracturing).

The compositions of the present disclosure may be prepared using any suitable method and/or equipment (e.g., blenders, mixers, stirrers, etc.) known in the art at any time prior to their use. The compositions may be prepared at a well site or at an offsite location.

In certain embodiments, the fluids of the present disclosure may be used during or in conjunction with any subterranean operation. For example, the additives of the present disclosure may be added to a drilling fluid, packer fluid, drill-in fluid, completion fluid, or any other fluid where metalate-based additives may be useful. In certain embodiments, the methods and compositions of the present disclosure may be used in the course of a using a pill in a subterranean wellbore. In some embodiments, the metalate-based additive may serve as a viscosifying and weighting agent for a small amount of fluid such as a pill used to clean a well. In certain embodiments, the metalate-based additive may be used to perform a solids-free sweep of a wellbore. Other suitable subterranean operations in which the methods and/or compositions of the present disclosure may be used include, but are not limited to drilling operations, completion operations, and other operations where metalate-based additives may be useful.

In certain embodiments of the present disclosure, metalate-based additives, treatment fluids, or related additives of the present disclosure may be introduced into a subterranean formation, a wellbore penetrating a subterranean formation, tubing (e.g., pipeline), and/or a container using any method or equipment known in the art. Introduction of the metalate-based additive, treatment fluids, or related additives of the present disclosure may in such embodiments include delivery via any of a tube, umbilical, pump, gravity, and combinations thereof. Additives, treatment fluids, or related compounds of the present disclosure may, in various embodiments, be delivered downhole (e.g., into the wellbore) or into top-side flowlines/pipelines or surface treating equipment.

For example, in certain embodiments, metalate-based additives, treatment fluids, or related additives of the present disclosure may be applied to a subterranean formation and/or wellbore using batch treatments, squeeze treatments, continuous treatments, and/or combinations thereof. In certain embodiments, a batch treatment may be performed in a subterranean formation by stopping production from the well and pumping a specific amount or quantity of metalate-based additive, treatment fluids, or related additives into a wellbore, which may be performed at one or more points in time during the life of a well. In other embodiments, a squeeze treatment may be performed by dissolving additives, treatment fluids, or related compounds in a suitable solvent at a suitable concentration and squeezing that solvent carrying the additives or related compounds downhole into the formation, allowing production out of the formation to bring the additives or related compounds to the desired location.

The additives of the present disclosure may directly or indirectly affect one or more components or pieces of equipment associated with the preparation, delivery, recapture, recycling, reuse, and/or disposal of the disclosed additives. For example, and with reference to FIG. 1, the additives of the present disclosure may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the additives of the present disclosure may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the additives of the present disclosure may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed additives may be stored, reconditioned, and/or regulated until added to the drilling fluid 122.

As mentioned above, the disclosed additives may directly or indirectly affect the components and equipment of the drilling assembly 100. For example, the disclosed additives may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, etc. The fluid processing unit(s) 128 may further include one or more sensors, gauges, pumps, compressors, and the like used store, monitor, regulate, and/or recondition the exemplary additives.

The additives of the present disclosure may directly or indirectly affect the pump 120, which representatively includes any conduits, pipelines, trucks, tubulars, and/or pipes used to fluidically convey the additives downhole, any pumps, compressors, or motors (e.g., topside or downhole) used to drive the additives into motion, any valves or related joints used to regulate the pressure or flow rate of the additives, and any sensors (i.e., pressure, temperature, flow rate, etc.), gauges, and/or combinations thereof, and the like. The additives of the present disclosure may also directly or indirectly affect the mixing hopper 134 and the retention pit 132 and their assorted variations.

The additives of the present disclosure may also directly or indirectly affect the various downhole equipment and tools that may come into contact with the additives of the present disclosure such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The additives of the present disclosure may also directly or indirectly affect any downhole heat exchangers, valves and corresponding actuation devices, tool seals, packers and other wellbore isolation devices or components, and the like associated with the wellbore 116. The additives of the present disclosure may also directly or indirectly affect the drill bit 114, which may include, but is not limited to, roller cone bits, PDC bits, natural diamond bits, any hole openers, reamers, coring bits, etc.

While not specifically illustrated herein, the additives of the present disclosure may also directly or indirectly affect any transport or delivery equipment used to convey the additives to the drilling assembly 100 such as, for example, any transport vessels, conduits, pipelines, trucks, tubulars, and/or pipes used to fluidically move the additives from one location to another, any pumps, compressors, or motors used to drive the additives into motion, any valves or related joints used to regulate the pressure or flow rate of the additives, and any sensors (i.e., pressure and temperature), gauges, and/or combinations thereof, and the like.

The fluids and compositions of the disclosure may also directly or indirectly affect the various downhole or subterranean equipment and tools that can come into contact with the fluid during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above.

To facilitate a better understanding of the present disclosure, the following examples of certain aspects of preferred embodiments are given. The following examples are not the only examples that could be given according to the present disclosure and are not intended to limit the scope of the disclosure or claims.

An embodiment of the present disclosure is a method comprising: providing a treatment fluid comprising a non-aqueous base fluid and at least one metalate-based additive comprising: an anion selected from the group consisting of: a tungstate, a molybdate, a vanadate, a manganate, and any combination thereof, and an organic cation; and introducing the treatment fluid into a wellbore penetrating at least a portion of a subterranean formation.

An embodiment of the present disclosure is a method comprising: providing a treatment fluid comprising a base fluid and a metalate-based additive comprising an anion selected from the group consisting of: a manganate, a vanadate, and any combination thereof; and introducing the treatment fluid into a wellbore penetrating at least a portion of a subterranean formation.

An embodiment of the present disclosure is a method comprising: providing a treatment fluid comprising a base fluid and at least one metalate-based additive comprising an anion selected from the group consisting of: a thiotungstate, a thiomolybdate, a thiovanadate, a thiomanganate and any combination thereof; and introducing the treatment fluid into a wellbore penetrating at least a portion of a subterranean formation.

An embodiment of the present disclosure is a method comprising: providing a treatment fluid comprising a base fluid and at least one metalate-based viscosifying agent comprising an anion selected from the group consisting of: a tungstate, a molybdate, a vanadate, a manganate, a thiotungstate, a thiomolybdate, a thiovanadate, a thiomanganate, and any combination thereof, wherein the metalate-based viscosifying agent is present at a concentration of from about 0.1% to about 30% by weight of the treatment fluid; and introducing the treatment fluid into a wellbore penetrating at least a portion of a subterranean formation.

An embodiment of the present disclosure is a composition comprising: a base fluid comprising a hydroxylic compound; and a metalate-based additive comprising an anion selected from the group consisting of: a thiotungstate, a thiomolybdate, a thiovanadate, a thiomanganate, and any combination thereof.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing a treatment fluid comprising a base fluid and at least one metalate-based additive comprising an anion selected from the group consisting of: a thiotungstate, a thiovanadate, a thiomanganate, and any combination thereof, wherein the at least one metalate-based additive is present in an amount from about 40% to about 95% by weight of the treatment fluid; and
introducing the treatment fluid into a wellbore penetrating at least a portion of a subterranean formation.

2. The method of claim 1, wherein the treatment fluid further comprises a hydroxylic compound.

3. The method of claim 1, wherein the metalate-based additive further comprises an inorganic cation.

4. The method of claim 1, wherein the metalate-based additive further comprises an organic cation.

5. The method of claim 1, wherein the base fluid is a non-aqueous base fluid.

6. The method of claim 1, wherein the treatment fluid comprises a polar organic fluid.

7. The method of claim 1, wherein the metalate-based additive lubricates one or more pieces of equipment in the wellbore.

8. The method of claim 1, wherein the metalate-based additive inhibits corrosion on one or more surfaces in the subterranean formation or the wellbore.

9. The method of claim 1, wherein the treatment fluid further comprises one or more weighting agents selected from the group consisting of: a barite, a hematite, calcium, a carbonate, magnesium carbonate, iron carbonate, zinc carbonate, manganese tetraoxide, an ilmenite, a formate salt, NaCl, KCl, CsCl$_2$, and any combination thereof.

10. The method of claim 4, wherein the organic cation is selected from the group consisting of: a quaternary amine, a polymer of a quaternary amine, an ammonium compound, a polymer of an ammonium compound, a phosphonium compound, a polymer of a phosphonium compound, a pyridine, an imidazole, a morpholine and any combination thereof.

11. The method of claim 3, wherein the inorganic cation is selected from the group consisting of: $H^+$, $Li^+$, $Na^+$, $K^+$, $Rb^+$, $Cs^+$, $Mg^{2+}$, $Ca^{2+}$, $Sr^{2+}$, $Ba^{2+}$, $Al^{3+}$, $Ti^{3+}$, $Ti^{4+}$, $Mn^{2+}$, $Mn^{3+}$, $Fe^{2+}$, $Fe^{3+}$, $Cu^{2+}$, $Cu^+$, $Zn^{2+}$, $Zr^{2+}$, $Zr^{3+}$, $Zr^{4+}$, and any combination thereof.

12. A method comprising:
providing a treatment fluid comprising a base fluid and at least one metalate-based additive comprising an anion selected from the group consisting of: a thiotungstate, a thiomolybdate, a thiovanadate, a thiomanganate, and any combination thereof; and
introducing the treatment fluid into a wellbore penetrating at least a portion of a subterranean formation, wherein upon introduction into the wellbore, the treatment fluid comprises the at least one metalate-based additive in an amount from about 40% to about 95% by weight of the treatment fluid.

13. The method of claim 12, wherein the treatment fluid further comprises a hydroxylic compound.

14. The method of claim 12, wherein the metalate-based additive further comprises an organic cation.

15. The method of claim 14, wherein the organic cation is selected from the group consisting of: a quaternary amine, a polymer of a quaternary amine, an ammonium compound, a polymer of an ammonium compound, a phosphonium compound, a polymer of a phosphonium compound, a pyridine, an imidazole, a morpholine, and any combination thereof.

16. The method of claim 12, wherein the base fluid is a non-aqueous base fluid.

17. A method comprising:
providing a treatment fluid comprising a base fluid and at least one metalate-based additive comprising a thiotungstate anion; and
introducing the treatment fluid into a wellbore penetrating at least a portion of a subterranean formation.

18. The method of claim 17, wherein the treatment fluid further comprises a hydroxylic compound.

19. The method of claim 17, wherein the metalate-based additive further comprises an organic cation.

* * * * *